(12) United States Patent
Frederiksen et al.

(10) Patent No.: US 8,201,042 B2
(45) Date of Patent: Jun. 12, 2012

(54) SYSTEM AND METHOD EMPLOYING FREQUENCY BAND FLIPPING FOR THE RETRANSMISSION OF DATA

(75) Inventors: Frank Frederiksen, Klarup (DK); Claudio Rosa, Randers (DK)

(73) Assignee: Nokia Corporation, Espoo (FI)

( * ) Notice: Subject to any disclaimer, the term of this patent is extended or adjusted under 35 U.S.C. 154(b) by 939 days.

(21) Appl. No.: 12/192,296

(22) Filed: Aug. 15, 2008

(65) Prior Publication Data

US 2009/0049355 A1 Feb. 19, 2009

Related U.S. Application Data

(60) Provisional application No. 60/956,651, filed on Aug. 17, 2007.

(51) Int. Cl.
*G06F 11/00* (2006.01)

(52) U.S. Cl. ........................................... 714/748

(58) Field of Classification Search ........... 714/748–752
See application file for complete search history.

(56) References Cited

U.S. PATENT DOCUMENTS

| | | | | |
|---|---|---|---|---|
| 6,738,370 | B2 * | 5/2004 | Ostman | 370/349 |
| 7,103,371 | B1 | 9/2006 | Liu | |
| 7,397,861 | B2 * | 7/2008 | Frederiksen et al. | 375/260 |
| 7,873,011 | B2 * | 1/2011 | Wang et al. | 370/330 |
| 2004/0199846 | A1 * | 10/2004 | Matsumoto et al. | 714/748 |
| 2005/0226198 | A1 | 10/2005 | Barak et al. | |
| 2006/0104374 | A1 | 5/2006 | Frederiksen et al. | |

FOREIGN PATENT DOCUMENTS

| | | |
|---|---|---|
| EP | 1 976 174 A1 | 1/2008 |
| EP | 1 983 783 A1 | 10/2008 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)," 3GPP TS 36.300, V1.0.0, Mar. 2007, pp. 1-82, 3GPP Organizational Partners, Sophia Antipolis Valbonne, France.

O. Dobre et al., "An Adaptive Data Transmission Scheme for OFDM Systems", vtc 2002—Fall. 2002 IEEE $5^{th}$ Vedhicular Technology Conference Proceedings, Vancouver, Canada, Sep. 24-28, 2002, IEEE Vehicular Technology Conference New York, NY: IEEE, U.S. vol. 1 of 4, Conf. 56, pp. 1398-1402, ISBN 0-7803-7467-3.

L. Cai et al., "Improved HARQ Scheme Using Channel Quality Feedback for OFDM System", Vehicular Technology Conference 2004, VTC 2004—Spring. 2004 IEEE $59^{th}$ Milan Italy, May 17-19, 2004, Piscataway, NJ USA, IEEE, US May 18, 2004, pp. 1869-1872, ISBN 0-07803-8255-2.

\* cited by examiner

*Primary Examiner* — Robert Beausoliel, Jr.
*Assistant Examiner* — Elmira Mehrmanesh
(74) *Attorney, Agent, or Firm* — Harrington & Smith

(57) ABSTRACT

For use in a communication system, an apparatus that, in one embodiment, includes a band flipping module configured to renumber physical resource blocks for a retransmission of data from physical resource blocks associated with a previous transmission of the data. The apparatus also includes a transceiver configured to retransmit the data in accordance with the renumbered physical resource blocks.

27 Claims, 8 Drawing Sheets

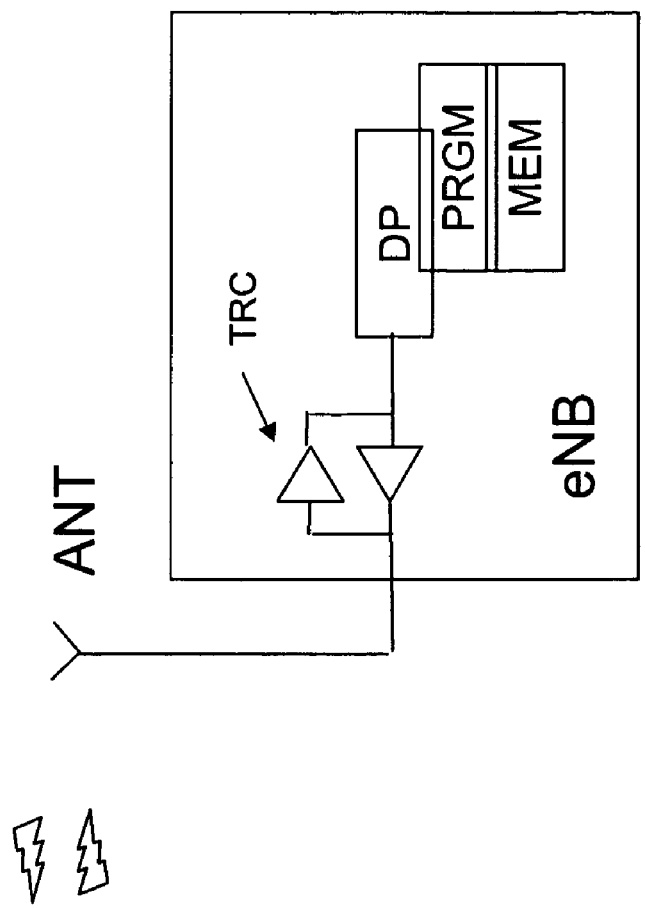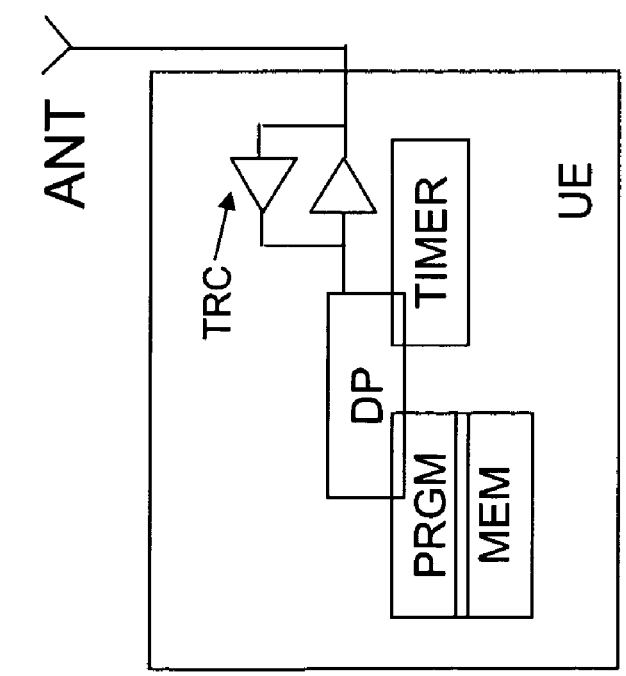
FIGURE 3

SYSTEM AND METHOD EMPLOYING FREQUENCY BAND FLIPPING FOR THE RETRANSMISSION OF DATA

This application claims the benefit of U.S. Provisional Application No. 60/956,651 entitled "Implementation of Frequency Band Flipping for Non-Adaptive H-ARQ," filed on Aug. 17, 2007, which is incorporated herein by reference.

TECHNICAL FIELD

The present invention relates, in general, to communication systems and, more particularly, to a system and method employing frequency band flipping for the retransmissions of data.

BACKGROUND

Broadcast and multicast communications are a form of point-to-multipoint communications wherein information is simultaneously transmitted from a single source to multiple destinations. The third generation partnership project ("3GPP") long term evolution ("LTE") describes an ongoing effort across the industry to improve the universal mobile telecommunications system ("UMTS") for mobile communications to cope with continuing new requirements and a growing base of users. The goals of this broadly based project include improving communication efficiency, lowering costs, improving services, making use of new spectrum opportunities, and achieving better integration with other open standards. The 3GPP LTE work item should result in new recommendations for standards for the UMTS.

One of the areas being considered in the LTE is the concept of uplink transmissions. Uplink transmissions are the transmissions that occur between the user equipment ("UE") and the evolved base station (which may be referred to interchangeably as "e-Node B" or "eNB"). In order to provide high spectral efficiency of the LTE, it is the current working assumption that hybrid automatic repeat request ("H-ARQ") will be utilized along with mechanisms such as fast or semi-fast link adaptation (adaptive modulation and coding), as well as, potentially, some kind of power control. H-ARQ is an error correction/control measure that automatically requests retransmission of data packets when an uncorrectable error is detected in a data packet.

Typically, prior to transmission, the data block and any error-detection information, such as cyclic redundancy checks ("CRC"), are encoded with an error-correction code, such as a Reed-Solomon code or Turbo code. When the coded data block is received, the receiver usually first decodes using the error-correction code. When the error-correction code is not capable of correcting all errors, the receiver requests retransmission of the data packet.

When looking at an implementation of H-ARQ in the uplink data channel, however, there is also a desire to have some feedback to be able to control the H-ARQ process (e.g., acknowledge ("ACK") or negative ACK ("NACK") to tell whether the data packet was received correctly at the e-Node B). One of the concerns for the LTE is how to optimize the utilization of the resources available on the physical air interface in such a way that produces a high performance result, while reducing the amount of resources used for control signalling. For the LTE uplink H-ARQ, it has been decided that the H-ARQ operation should be based on synchronous processes, such as when a retransmission of an erroneously received data packet would routinely occur at a pre-determined time instant after the initial transmission (delayed by 'n' transmission time intervals ("TTIs")). The adaptive and non-adaptive H-ARQ options are supported by the third generation partnership project.

Non-adaptive H-ARQ uses the same physical resources that were used for the initial transmission for the retransmission, while adaptive H-ARQ obtains a new resource assignment to select which of the new resources to use for the retransmission. Since the adaptive H-ARQ allocates new physical channel resources for retransmissions, it accommodates potential frequency and interference diversity, which helps avoid data collisions through user equipment movement. One problem with adaptive H-ARQ, however, is that each retransmission will use a full entry in the resource allocation information.

Non-adaptive H-ARQ requires only a small amount of signaling. In extreme cases, only a single bit is used to request the retransmission, since both UE and e-Node Bs already generally know what to do for a retransmission. That is, both the UE and e-Node Bs are pre-configured with the information regarding which physical resources are allocated/reserved for the retransmission. Since the retransmission happens in a pre-defined place in the resource domain, however, there is generally no frequency or interference diversity. This lack of diversity allows occasional packet collisions due to the use of resources that may have already been allocated to semi-permanent users. Thus, each of the currently available H-ARQ schemes includes problems along with their respective benefits.

Accordingly, what is need in the art is a system and method that effectively manages a request for and the retransmission of data that overcomes the deficiencies in the prior art.

SUMMARY

These and other problems are generally solved or circumvented, and technical advantages are generally achieved, by embodiments of the present invention, which include an apparatus that, in one embodiment, includes a band flipping module configured to renumber physical resource blocks for a retransmission of data from physical resource blocks associated with a previous transmission of the data. The apparatus also includes a transceiver configured to retransmit the data in accordance with the renumbered physical resource blocks. The apparatus (e.g., user equipment) may be embodied in a method or means for performing the functions thereof, or a computer program product including program code stored in a computer readable medium configured to perform the functions thereof.

In another aspect, the present invention provides a communication system having a base station and user equipment. In one embodiment, the base station includes a transceiver configured to receive a transmission of data, a decoder configured to decode the data, and a hybrid automatic request retransmission module configured to issue a retransmission request for the data. The user equipment includes a hybrid automatic request retransmission module configured to receive the retransmission request for the data. The user equipment also includes a band flipping module configured to renumber physical resource blocks for a retransmission of the data from physical resource blocks associated with the transmission of the data. A transceiver of the user equipment is configured to retransmit the data in accordance with the renumbered physical resource blocks.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawing, in which:

FIG. 3 illustrates a block diagram of an embodiment of a wireless communication system that provides an environment for the application of the principles of the present invention;

DETAILED DESCRIPTION OF ILLUSTRATIVE EMBODIMENTS

The making and using of the presently advantageous embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. The present invention will be described with respect to exemplary embodiments in a specific context, namely an LTE 3GPP UMTS. The invention may also be applied, however, to other types of communication systems that employ subsystems or modules for the retransmission of data and may also utilize an H-ARQ system for error checking and correction.

Figure 1:
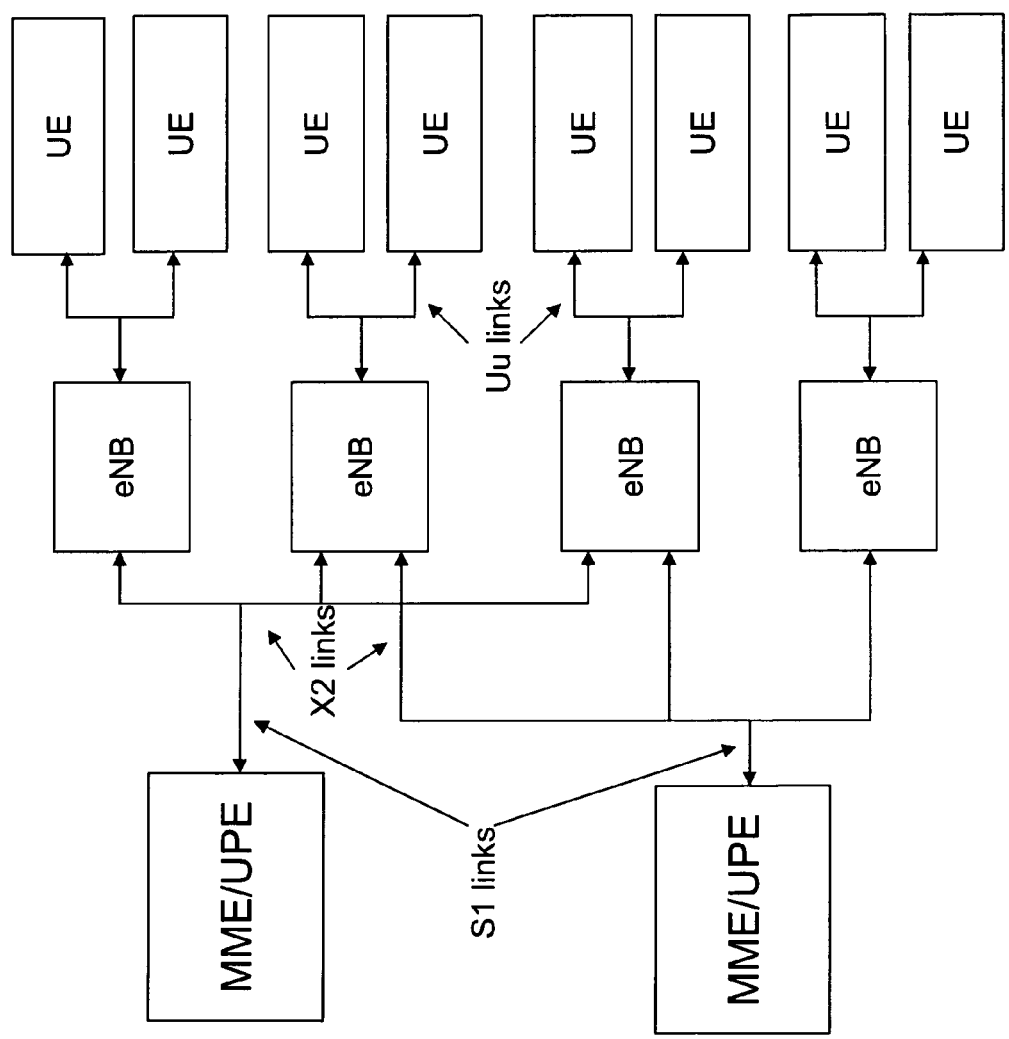
FIG. 1 illustrates a system level diagram of an embodiment of a communication system including a wireless communication system that provides an environment for the application of the principles of the present invention.

Referring initially to FIG. 1, illustrated is a system level diagram of an embodiment of a communication system including a wireless communication system that provides an environment for the application of the principles of the present invention. The wireless communication system may be configured to provide evolved UMTS terrestrial radio access network ("e-UTRAN") universal mobile telecommunications services. Mobile management entities ("MMEs") and user plane entities ("UPEs") (designated "MME/UPE") provide control functionality for an e-UTRAN node B (designated "eNB") via S1 communication links. The eNBs communicate therebetween via X2 communication links. The various communication links are typically fiber, microwave, or other high-frequency metallic communication paths such as coaxial links, or combinations thereof.

The eNBs communicate with user equipment (designated "UE"), which may be mobile transceivers carried by a user. Thus, the communication links, Uu links, coupling the eNBs to the user equipment are air links employing a wireless communication signal, such as a 1.8 GHz orthogonal frequency division multiplex ("OFDM") signal, or the like.

Figure 2:
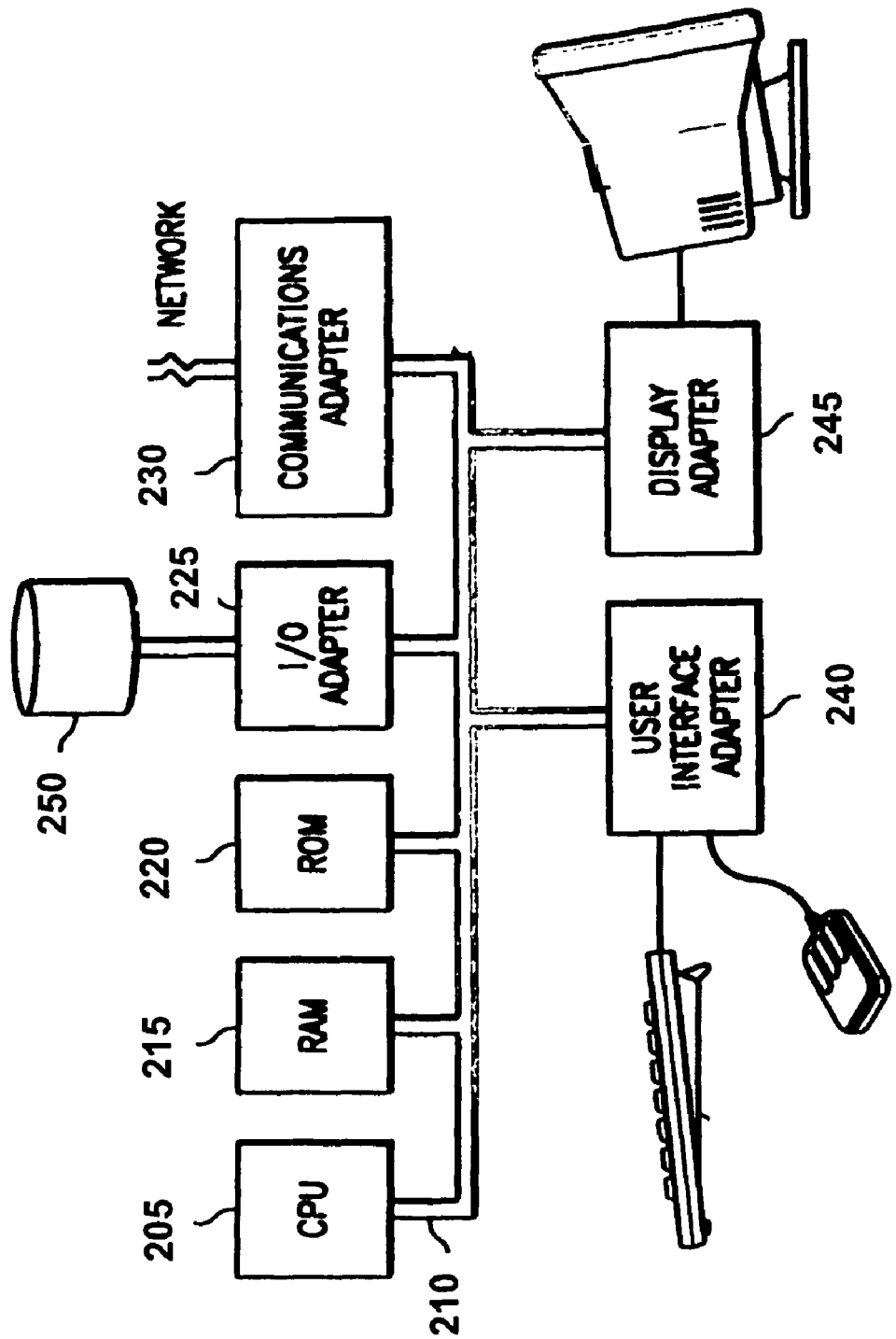
FIG. 2 illustrates is a block diagram of an embodiment of a computer system in accordance with the systems, subsystems and modules of the present invention.

Turning now to FIG. 2, illustrated is a block diagram of an embodiment of a computer system in accordance with the systems, subsystems and modules of the present invention. The computer system is adapted to perform various functions such as storing and/or executing software associated with the systems, subsystems and modules as described herein. A central processing unit ("CPU") 205 is coupled to a system bus 210. The CPU 205 may be any general purpose computer and embodiments of the present invention are not restricted by the architecture of the CPU 205. The bus 210 is coupled to a random access memory ("RAM") 215, which may be a static random access memory ("SRAM"), dynamic random access memory ("DRAM"), or synchronous dynamic random access memory ("SDRAM"). A read only memory ("ROM") 220 is also coupled to the bus 210, which may be programmable read only memory ("PROM"), erasable programmable read only memory ("EPROM"), or electrically erasable programmable read only memory ("EEPROM"). The RAM 215 and the ROM 220 hold user and system data and programs as are well known in the art.

The bus 210 is also coupled to input/output ("I/O") adapter 225, communications adapter 230, user interface adapter 240, and display adapter 245. The I/O adapter 225 connects storage devices 250, such as one or more of a hard drive, a compact disc ("CD") drive, a floppy disk drive, or a tape drive, to computer system. The I/O adapter 225 is also connected to a printer (not shown), which would allow the system to print paper copies of information such as documents, photographs, articles, and the like. Note that the printer may be a printer (e.g., dot matrix, laser, and the like), a fax machine, scanner, or a copier machine.

Turning now to FIG. 3, illustrated is a block diagram of an embodiment of a wireless communication system that provides an environment for the application of the principles of the present invention. The wireless communication system includes user equipment (designated "UE") in communication with an e-Node B (designated "eNB"). The user equipment includes a data processor (designated "DP"), a memory (designated "MEM"), which stores programs (designated "PRGM"), a timer (designated "TIMER"), a radio frequency transceiver (designated "TRC") (including UE antenna controller), and an antenna (designated "ANT") for bidirectional wireless communications with the e-Node B. The e-Node B includes a data processor (designated "DP"), a memory (designated "MEM"), which stores programs (designated "PRGM"), a radio frequency transceiver (designated "TRC") (including e-Node B antenna controller), and antenna (designated "ANT") for bidirectional wireless communications with the user equipment. In general, the e-Node B provides the e-UTRA user plane (e.g., radio link control/media access control/physical) and control plane (e.g., radio resource control) protocol terminations toward the user equipment.

The memory, as introduced above, may be of any type suitable to the local technical environment and may be implemented using any suitable data storage technology, such as semiconductor based memory devices, magnetic memory devices and systems, optical memory devices and systems, fixed memory and removable memory, and the like. The data processors may be of any type suitable to the local technical environment, and may include one or more of general purpose computers, special purpose computers, microprocessors, digital signal processors ("DSPs"), processors based on a multi-core processor architecture, and the like, as non-limiting examples. The programs include program instructions that, when executed by the associated data processor, enable the electronic device to perform tasks as described herein. Exemplary embodiments of the system, subsystems and modules as described herein may be implemented at least in part by computer software executable by the data processors of the user equipment and e-Node B, or by hardware, or combinations thereof.

The functionality performed by the user equipment in general, may be organized and modeled as a stack of layers in accordance with the open system interconnection seven-layer model. Among the layers therein are a media access control ("MAC") layer and other layers located above the MAC layer, such as networking and transport layers. The MAC layer offers certain services to the higher layers, including services that are related to the operation of the uplink. The MAC layer includes an implementation of the uplink MAC protocol. The uplink MAC protocol provides procedures followed by the user equipment and e-Node B to transmit and receive using the uplink.

A physical ("PHY") layer is located conceptually below the MAC layer. The MAC layer requests certain services from the PHY layer. These services are related to the physical transmission of packets to the e-Node B. The MAC layer receives one or more flows from the higher layers. A flow is a stream of data, typically corresponding to a specific application such as a voice over Internet protocol ("VoIP") communication session, videotelephony, gaming, or the like.

In order to communicate the physical layer packet format to the user equipment, a compatible PHY layer signaling or MAC channel signaling is generally employed. Each MAC layer packet section may include one or more MAC layer payloads in accordance with the MAC layer multi-user packet format.

Figure 4:
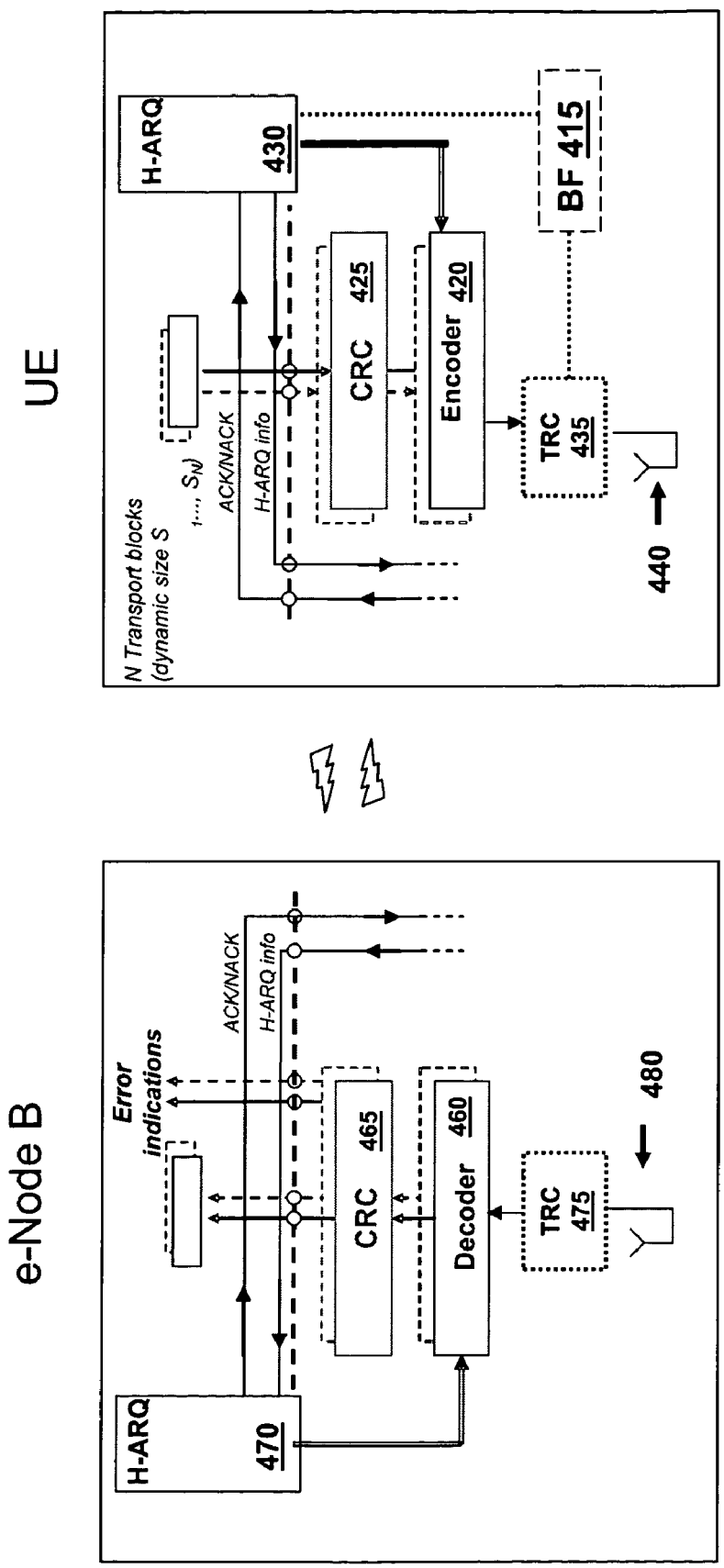
FIG. 4 illustrates a block diagram of an embodiment of user equipment and a base station of a communication system in accordance with the principles of the present invention.

Turning now to FIG. 4, illustrated is a block diagram of an embodiment of user equipment and a base station (also referred to as an "e-Node B" or "eNB") of a communication system in accordance with the principles of the present invention. The user equipment (designated "UE") and base station (designated "e-Node B") are compatible with 3GPP TS 36.300, referred to as the "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" V1.0.0 (2007-03), which is incorporated herein by reference. The illustrated communication system demonstrates uplink communication from the user equipment to the base station and uses non-adaptive H-ARQ for such uplink communication. Additionally, a MAC layer and physical layer of the user equipment operate to control the physical process of the uplink including the uplink for H-ARQ. The user equipment includes an encoder (e.g., a coding and rate matching ("RM") module) 420, a cyclic redundancy check ("CRC") module 425, an H-ARQ module 430, a transceiver 435 and an antenna 440.

The base station includes a decoder (e.g., a decoding and rate matching ("RM") module) 460, a cyclic redundancy check ("CRC") module 465, an H-ARQ module 470, a transceiver 475 and an antenna 480. After receipt (via the transceiver 475 and antenna 480) and physical transmission processing of data packets at the base station, the decoder 460 decodes the transport information using an opposite decoding process to the encoder 420 of the user equipment. The decoder 460 also supports retransmit requests from the H-ARQ module 470 of the base station. The transport information is thereafter provided to the CRC module 465 for error detection. If the decoder 460 finds errors in the decoding of the transport information or if CRC module 465 finds non-correctable errors, the decoder 460 signals H-ARQ module 470, in accordance with the MAC layer, to issue a retransmit request to the user equipment using the antenna 480. The user equipment receives the retransmit request from the base station at the antenna 440. Upon deciphering the retransmit request successfully, the user equipment will retransmit the specific encoded data packet requested back to the base station.

In the operation of communication system, instead of having the user equipment re-use the same physical resources that were used in the initial transmission of the data packet requested for retransmission by the base station, a band flipping module 415, in accordance with the MAC layer and physical layer thereof, renumbers the physical/logical physical resource blocks ("PRBs") for the uplink on a per-H-ARQ basis. Therefore, prior to retransmission of the data packet, the PRBs (e.g., the "bands") for the uplink are changed such as flipped in accordance with the band flipping module 415. Thus, instead of retransmitting the data packets on the same set of original frequencies, the user equipment retransmits the packets on a different set of frequencies via the transmitter 435 and antenna 440. The bands are preferably flipped every 'X' TTIs, where 'X', for example, is a parameter set by the network. In applications wherein full diversity gain is desired, 'X' should be set to equal the number of stop-and-wait ("SAW") channels in the particular cell. Of course, the band flipping module 415 and other subsystems and modules as described herein may be located with other systems of the communication system.

Compared to pure non-adaptive H-ARQ, the addition of the band flipping module 415 of an error checking system provides frequency diversity that improves the average performance of the received signal. There is also a gain in terms of reduced downlink control channel signaling overhead. Thus, the error checking system includes, without limitation, a decoder and a band flipping module. It should be understood that the broad scope of the present invention is not limited to H-ARQ related systems and applies to automatic retransmissions in general such as with multi-TTI communications. For instance, an uplink transmission may cover a number of consecutive retransmissions of the same information or data packet without waiting for an ACK/NACK confirmation. The ACK/NACK confirmation is sent from the base station after a pre-determined number of receptions (e.g., four receptions). A band flipping module as described herein may be used to advantage under these circumstances as well.

Figure 5:
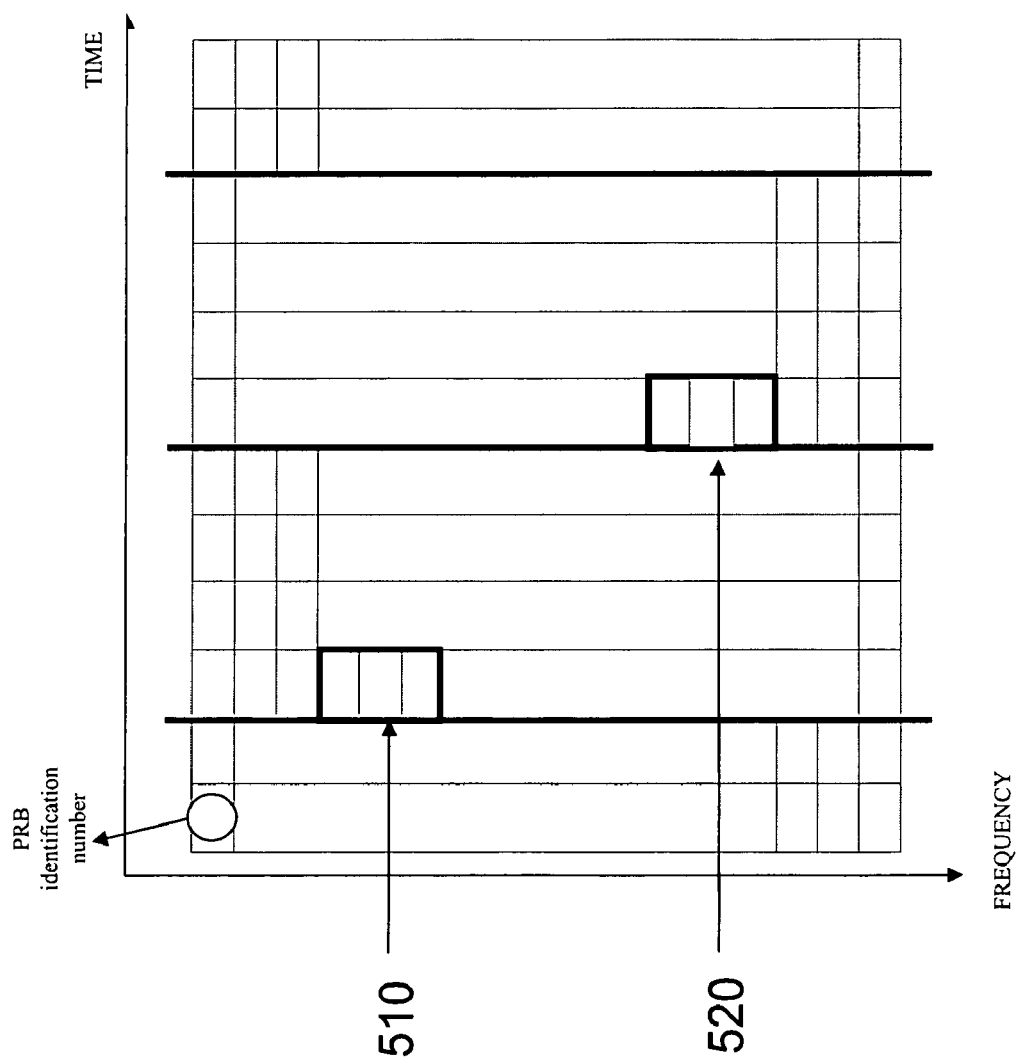
FIG. 5 illustrates a chart showing an embodiment of band flipping of uplink resources in a communication system in accordance with the principles of the present embodiment.

Turning now to FIG. 5, illustrated is a chart showing an embodiment of band flipping of uplink resources in a communication system in accordance with the principles of the present embodiment. The chart is configured having a time axis and a frequency axis. Each block illustrated in the chart represents a PRB identification number. An original or previous data packet is transmitted from the user equipment to the base station using PRB blocks collectively designated 510. On receipt of the H-ARQ request issued by the base station or upon the occurrence of a pre-determined number of receptions, the retransmitted data packet is transmitted from the user equipment on PRB blocks collectively designated 520. As illustrated, the PRB blocks 510 represent different frequencies than the PRB blocks 520. Therefore, the frequency diversity is increased in the uplink H-ARQ by flipping the band or renumbering the PRB blocks for the packet retransmission.

It should be noted that the various embodiments of the present invention do not prohibit using frequency selective scheduling. If the frequency selective scheduling properties of the radio channel are to be maintained, the retransmissions should be scheduled using a normal uplink resource grant (e.g., adaptive H-ARQ).

Figure 6:
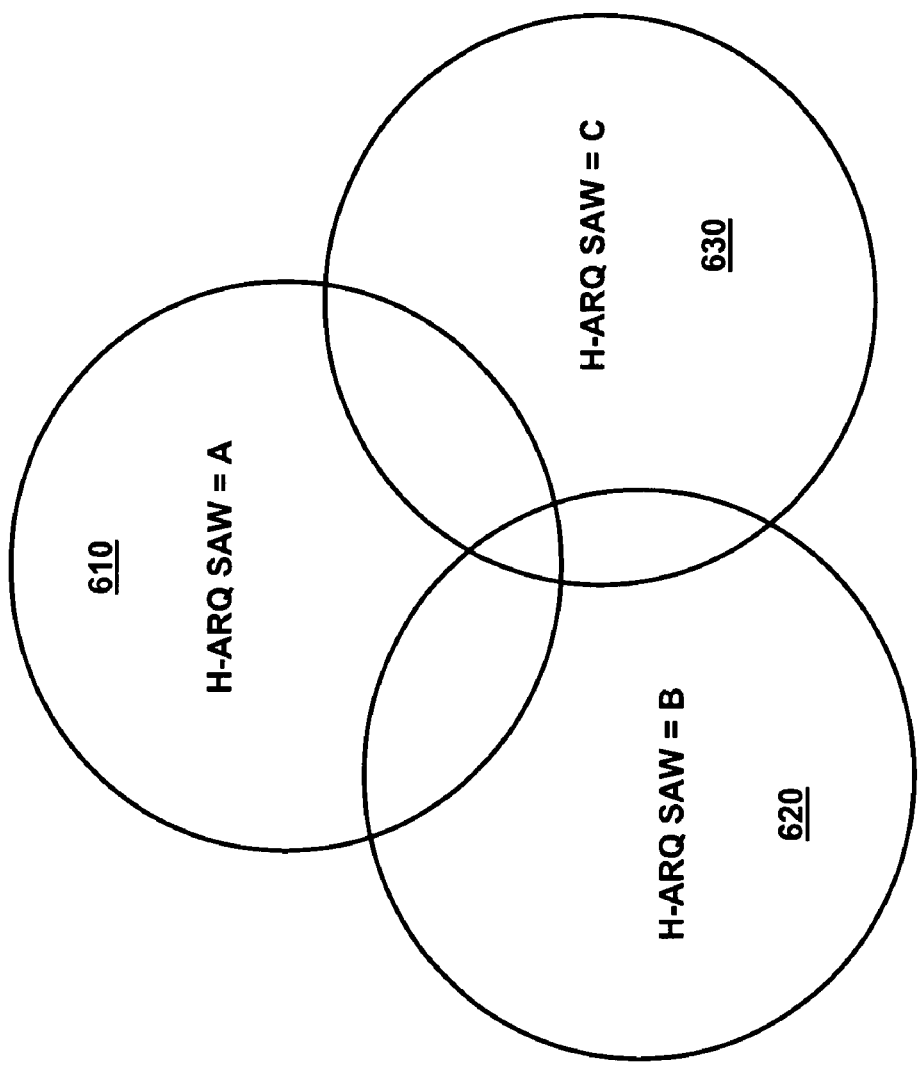
FIGS. 6 and 7 illustrate diagrams demonstrating embodiments of individual cells of cellular communications networks in accordance with the principles of the present invention.

Turning now to FIG. 6, illustrated is a diagram demonstrating an embodiment of individual cells 610, 620, 630 of a cellular communications network in accordance with the principles of the present invention. The cells 610, 620, 630 are neighboring cells, and their individual coverage overlaps into the coverage zone of their neighbors to facilitate continuous network coverage. The user equipment within each of cells 610, 620, 630 establish communication with the base station located in the cell. By applying the band flipping mechanism to the uplink H-ARQ, there is an overall improvement to the received signals based on the improved frequency diversity. Even though frequency diversity improves, however, the band flipping mechanism alone does not generally improve interference averaging. The cellular communications network is configured such that neighboring cells (e.g., cells 610, 620, 630) have a different number of H-ARQ stop-and-wait ("SAW") channels. The first cell 610 has 'A' number of SAW channels, the second cell 620 has 'B' number of SAW channels, and the third cell 630 has 'C' number of SAW channels. Since the neighboring cells (e.g., cells 610, 620, 630) will generally be the interfering cells having different numbers of SAW channels, the result is an increased interference averaging in the uplink H-ARQ. The drawback of this configuration having different numbers of SAW channels in adjacent cells is that the H-ARQ delay is "artificially" increased to provide the interference diversity.

Figure 7:
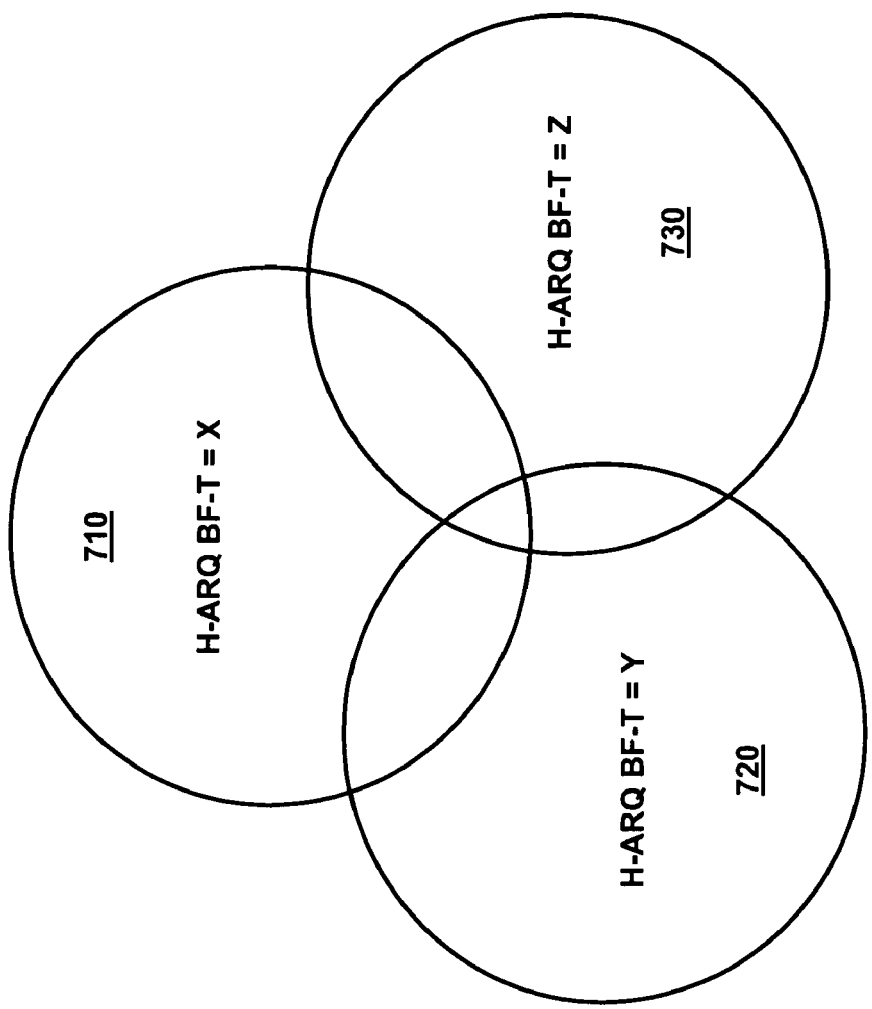

Turning now to FIG. 7, illustrated is a diagram demonstrating an embodiment of individual cells 710, 720, 730 of a cellular communications network in accordance with the principles of the present invention. Instead of configuring different numbers of SAW channels to improve interference diversity, the cellular communications network provides slightly different band flipping periods ("BF-T") in neighboring cells. Therefore, neighboring cells (e.g., cells 710, 720, 730) each have slightly different BF-Ts. The first cell 710 has a BF-T of 'X', the second cell 720 has a BF-T of 'Y', and third cell 730 has a BF-T of 'Z'. As noted above, the flipping period may be equal to the number of SAW channels in the cell. Thus, for purposes of this example, the first cell 710 has a BF-T of 'X', where 'X' equals the number of SAW channels therein. Since the BF-T is slightly different in each of the cells, interference diversity will improve. The level of frequency diversity, however, may also decrease with the varying BF-T. A cell that has a BF-T that is larger than the number of H-ARQ SAW channels will not get the full frequency diversity gain of straight band flipping.

Figure 8:
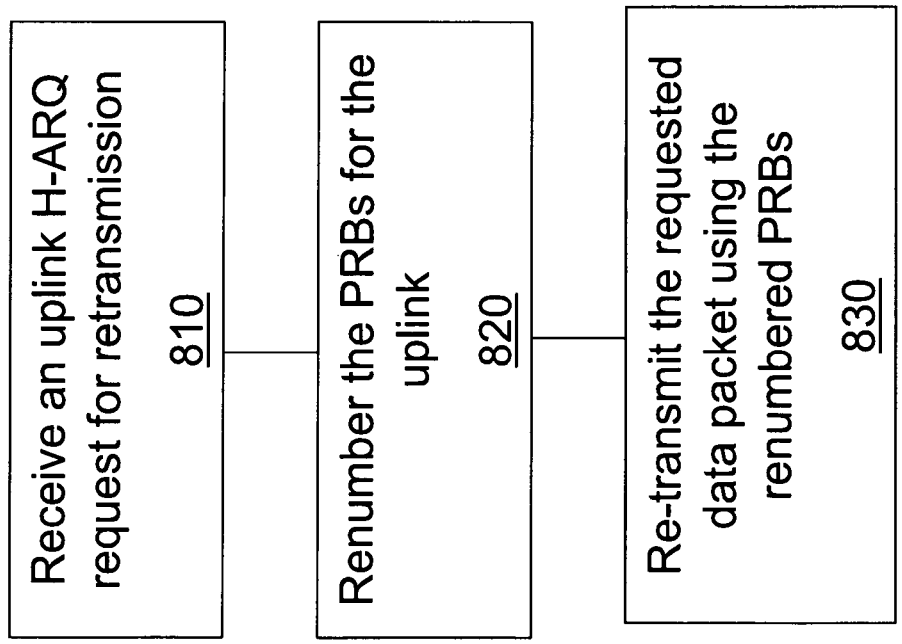
FIG. 8 illustrates a flowchart demonstrating exemplary steps in an embodiment of a method in accordance with the principles of the present invention.

Turning now to FIG. 8, illustrated is a flowchart demonstrating exemplary steps in an embodiment of a method in accordance with the principles of the present invention. In a step 810, an uplink H-ARQ request for retransmission is received or a pre-determined number of receptions is received. In response thereto, the PRBs for the uplink are renumbered in a step 820. The requested data packet is then retransmitted, in a step 830, using the renumbered PRBs.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an EPROM, a floppy diskette, a compact disk CD-ROM, an optical disk, a hard disk, a fiber optic medium, a radio frequency ("RF") link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Thus, representative embodiments of the present invention are directed to a method for use in a communication system that uses a retransmission of data packets in accordance with, for instance, non-adaptive H-ARQ for uplink communications between user equipment and base stations. The method includes receiving an indication that a received data packet should be resent and initiating an uplink H-ARQ message to request retransmission. In response to initiating the H-ARQ message, the PRBs of the original or previous packet transmission are re-numbered for different transmission frequencies. The H-ARQ request message is transmitted using the re-numbered PRBs.

In addition to the renumbering in response to the retransmission, the renumbering is further responsive to a running of a predetermined period, which may be measured in TTIs. The predetermined period may also be set to equal the number of SAW channels in a host cell. The representative methods may also include configuring a plurality of neighboring cells to have a different predetermined period. Alternatively, the representative methods may also include configuring a plurality of neighboring cells to have a different number of stop-and-wait channels.

In accordance with another embodiment of the present invention, an error checking system for use with user equipment in a communication system includes an H-ARQ module configured to receive a retransmission request from a base station. A band flipping module is configured to renumber one or more physical resource blocks from an original or previous data transmission from the user equipment. A transceiver via an antenna controls retransmitting any data packet associated with the retransmission request, wherein the transceiver transmits the data packet according to the renumbered one or more physical resource blocks.

The error checking system may also be configured such that the band flipping module renumbers the one or more PRBs either on receipt of the retransmission request, at the end of a predetermined time period, or some combination of both. The predetermined time period may be any of various units, including the number of SAW channels in the host cell. In addition, the error checking system may also include a plurality of cells making up the cellular communications network, wherein neighboring ones of the plurality of cells are configured having a different one of the predetermined period. Alternatively, the neighboring ones of the plurality of cells are configured with a different number of stop-and-wait channels.

In accordance with a further embodiment of the present invention, a computer program product having a computer readable medium with computer program logic recorded thereon is provided. The computer program product includes code for initiating a retransmission of a data packet, code for renumbering one or more physical resource blocks associated with an original or previous transmission of the data packet in response thereto, and code for retransmitting the data packet using the renumbered one or more physical resource blocks.

In addition, the computer program product code for renumbering may be further responsive to a running of a predetermined period, which may be measured in TTIs. Various embodiments of the representative computer program products may set the predetermined period to equal the number of SAW channels in the host cell. Alternatively, some variation of that number may also be used. Additionally, the computer program products of representative embodiments may also include code for configuring a plurality of neighboring cells to have a different predetermined period. Alternatively, these representative embodiments may have code for configuring a plurality of neighboring cells to have a different number of stop-and-wait channels.

In accordance with a further embodiment of the present invention, user equipment is provided for operation within a communication system. The user equipment includes an antenna, transceiver and a processor for controlling the functionality and features of the user equipment. It also includes an encoder and decoder operable in conjunction with the processor for coding and decoding message signals received from a plurality of user equipment. A MAC layer, also operable in conjunction with the processor, facilitates uplink transmission between the user equipment and a base station within the communication system. A band flipping module (e.g., residing within the MAC layer) is configured to renumber the PRBs of an original or previous data transmission for a retransmission triggered by receipt of an H-ARQ retransmission request from the base station or following a predetermined number of receptions.

As described above, the exemplary embodiment provides both a method and corresponding apparatus consisting of various modules providing functionality for performing the steps of the method. The modules may be implemented as hardware (including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus, comprising:
    a transmitter configured to transmit a data packet using a first set of n physical resource blocks, each individual one of the n physical resource blocks of the first set having an associated number;
    a band flipping module configured to respond to a retransmission request to retransmit the data packet by selecting a second set of n physical resource blocks, where each individual one of the n physical resource blocks of the second set has an associated number that differs from the number of a corresponding physical resource block of the first set such that the n physical resource blocks of the second set are renumbered from the n physical resource blocks of the first set; and
    said transmitter further configured to retransmit the data packet using the second set of n physical resource blocks.

2. The apparatus as recited in claim 1 further comprising a hybrid automatic retransmission module configured to receive the retransmission request for said data packet.

3. The apparatus as recited in claim 1 wherein said band flipping module is configured to renumber said physical resource blocks for said retransmission of said data packet upon receipt of the retransmission request or at an end of some predetermined time.

4. The apparatus as recited in claim 1 wherein each physical resource block of the second set has an associated transmission frequency that is different than an associated transmission frequency of the corresponding physical resource block of the first set.

5. The apparatus as recited in claim 1 wherein said band flipping module is configured to renumber said physical resource blocks by flipping a band thereof every "X" number of transmission time intervals.

6. The apparatus as recited in claim 5 wherein said value of "X" is equal to a number of stop-and-wait channels of a cell in a cellular communications network employing said apparatus.

7. The apparatus as recited in claim 6 wherein said number of stop-and-wait channels of said cell in said cellular communications network is different than a number of stop-and-wait channels of another cell in said cellular communications network.

8. The apparatus as recited in claim 5 wherein said value of "X" is equal to a band flipping period of a cell in a cellular communications network employing said apparatus.

9. The apparatus as recited in claim 8 wherein said band flipping period of said cell in said cellular communications network is different than a band flipping period of another cell in said cellular communications network.

10. The apparatus as recited in claim 1 further comprising an encoder configured to code and rate match data of said data packet, and a cyclic redundancy check module configured to perform error detection on said data.

11. An apparatus, comprising:
    means for transmitting a data packet using a first set of n physical resource blocks, each individual one of the n physical resource blocks of the first set having an associated number;
    means, responsive to a retransmission request to retransmit the data packet, for renumbering physical resource blocks by selecting a second set of n physical resource blocks, where each individual one of the n physical resource blocks of the second set has an associated number that differs from the number of a corresponding physical resource block of the first set such that the n physical resource blocks of the second set are renumbered from the n physical resource blocks of the first set; and said transmitting means further configured to retransmit the data packet using the second set of n physical resource blocks.

12. The apparatus as recited in claim 11 wherein said means for renumbering is configured to renumber said physical resource blocks upon receipt of the retransmission request or at an end of some predetermined time.

13. The apparatus as recited in claim 11 wherein said means for renumbering is configured to renumber said physical resource blocks by flipping a band thereof every "X" number of transmission time intervals.

14. A computer program product comprising program code stored in a non-transitory computer readable medium configured when executed by a processor to transmit a data packet using a first set of n physical resource blocks, each individual one of the n physical resource blocks of the first set having an associated number;

to respond to a retransmission request to retransmit the data packet by selecting a second set of n physical resource blocks, where each individual one of the n physical resource blocks of the second set has an associated number that differs from the number of a corresponding physical resource block of the first set such that the n physical resource blocks of the second set are renumbered from the n physical resource blocks of the first set; and to retransmit the data packet using the second set of n physical resource blocks.

15. The computer program product as recited in claim 14 wherein said program code stored in said computer readable medium is configured to renumber said physical resource blocks upon receipt of the retransmission request or at an end of some predetermined time.

16. A method, comprising:

transmitting a data packet using a first set of n physical resource blocks, each individual one of the n physical resource blocks of the first set having an associated number;

selecting, in response to a retransmission request to retransmit the data packet, a second set of n physical resource blocks, where each individual one of the n physical resource blocks of the second set has an associated number that differs from the number of a corresponding physical resource block of the first set such that the n physical resource blocks of the second set are renumbered from the n physical resource blocks of the first set; and retransmitting the data packet using the second set of n physical resource blocks.

17. The method as recited in claim 16 wherein said physical resource blocks are renumbered for said retransmission upon receipt of the retransmission request or at an end of some predetermined time.

18. The method as recited in claim 16 wherein each physical resource block of the second set has an associated transmission frequency that is different than an associated transmission frequency of the corresponding physical resource block of the first set.

19. The method as recited in claim 16 wherein said physical resource blocks are renumbered by flipping a band thereof every "X" number of transmission time intervals.

20. The method as recited in claim 19 wherein said value of "X" is equal to a number of stop-and-wait channels of a cell in a cellular communications network wherein the method is executed.

21. The method as recited in claim 20 wherein said number of stop-and-wait channels of said cell in said cellular communications network is different than a number of stop-and-wait channels of another cell in said cellular communications network.

22. The method as recited in claim 19 wherein said "X" is equal to a band flipping period of a cell in a cellular communications network wherein the method is executed.

23. The method as recited in claim 22 wherein said band flipping period of said cell in said cellular communications network is different than a band flipping period of another cell in said cellular communications network.

24. The method as recited in claim 16 further comprising coding and rate matching data of said data packet, and performing error detection on said data.

25. The method as recited in claim 16 wherein said method is performed by user equipment in a communication system.

26. A method, comprising:

transmitting a data packet using a first set of n physical resource blocks where n is greater than one, each individual one of the n physical resource blocks of the first set having an associated consecutive number and corresponding to n consecutive transmission frequencies of a first set transmission frequencies;

selecting, in response to a retransmission request to retransmit the data packet, a second set of n physical resource blocks, where each individual one of the n physical resource blocks of the second set has an associated consecutive number that differs from the number of a corresponding physical resource block of the first set such that the n physical resource blocks of the second set are renumbered from the n physical resource blocks of the first set and correspond to n consecutive transmission frequencies of a second set of transmission frequencies different than the transmission frequencies of the first set transmission frequencies; and retransmitting the data packet using the second set of n physical resource blocks.

27. The method as recited in claim 26, where said physical resource blocks are renumbered by flipping a frequency band thereof every "X" number of transmission time intervals where the value of "X" is equal to a number of stop-and-wait channels of a cell in a cellular communications network wherein the method is executed.

* * * * *